ABSTRACT

United States Patent [19]
Jeger et al.

[11] 3,890,395
[45] June 17, 1975

[54] PROCESS FOR THE PHOTOCYCLIZATION OF THE DIHYDRO-IONONES AND THEIR HOMOLOGUES, AND THE PRODUCTS OBTAINABLE BY THIS PROCESS

[75] Inventors: Oskar Jeger, Zollikerberg; Hans Wolf; Markus Zink, both of Zurich, all of Switzerland

[73] Assignee: Ciba-Geigy Corporation, Ardsley, N.Y.

[22] Filed: Oct. 16, 1972

[21] Appl. No.: 298,151

[30] Foreign Application Priority Data
Oct. 18, 1971  Switzerland....................... 15162/71
Oct. 18, 1971  Switzerland....................... 15163/71

[52] U.S. Cl.............. 260/617 F; 204/158; 252/522; 260/333; 260/346.1 R; 260/346.2 M; 260/346.2 R
[51] Int. Cl............................................ C07c 35/32

[58] Field of Search................................ 260/617 F

[56]     References Cited
OTHER PUBLICATIONS

Ohloff et al., "Chem. Abstracts," Vol. 72, p. 133009L (1970).

*Primary Examiner*—Joseph E. Evans
*Assistant Examiner*—D. B. Springer
*Attorney, Agent, or Firm*—Joseph G. Kolodny; John J. Maitner; Theodore O. Groeger

[57]     ABSTRACT

On exposure to light, preferably to ultraviolet light in an organic solvent, the dihydro-ionones and their homologues yield photocyclization products which are valuable odoriferous substances and useful as ingredients in perfume compositions, perfumed products and flavouring compositions.

4 Claims, No Drawings

PROCESS FOR THE PHOTOCYCLIZATION OF THE DIHYDRO-IONONES AND THEIR HOMOLOGUES, AND THE PRODUCTS OBTAINABLE BY THIS PROCESS

DETAILED DESCRIPTION

The present invention relates to a process for the photocyclization of dihydro-ionones and their homologues, to the photocyclization products, as new substances, obtained according to the invention, as well as to perfume compositions, perfumed products and flavouring compositions containing the said new substances.

The process comprises the irradiation of a compound of the general formula I

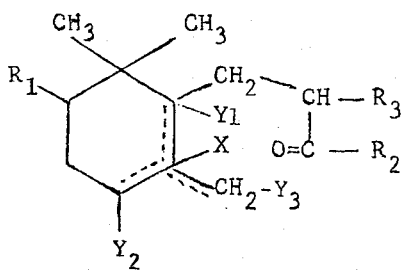

wherein
$R_1$, $R_2$ and $R_3$ each independently represent hydrogen or lower alkyl groups, X together with $Y_1$ or $Y_2$ or $Y_3$ represents an additional bond, and correspondingly the remaining two of the symbols $Y_1$, $Y_2$ and $Y_3$ each represent a hydrogen atom;
and the isolation of the obtained photocylization product, the said product in the case where $Y_2$ and $Y_3$ in the compound of formula I are hydrogen atoms being a mixture of the compounds of formulae II, III and IV

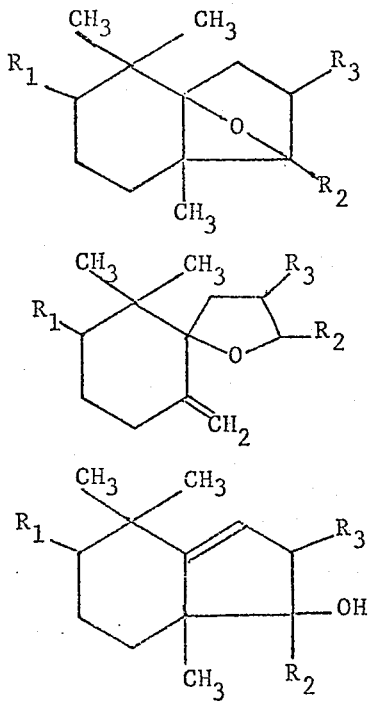

and in the case where $Y_1$ and $Y_3$ in the compound formula I are hydrogen atoms being the compound of formula V

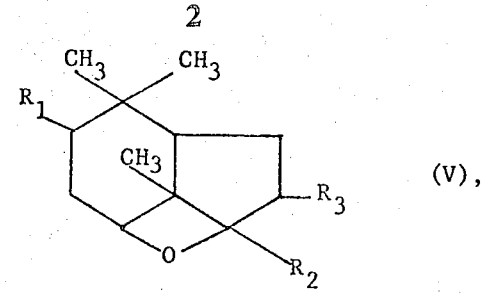

and in the case where $Y_1$ and $Y_2$ in the compound of formula I are hydrogen atoms being a mixture of the compound of the above formula II and the compound of the formula VI

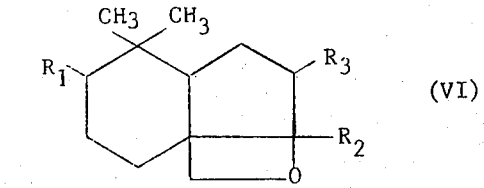

wherein $R_1$, $R_2$ and $R_3$ always have the meaning given under formula I; and, optionally, the separation of the mixture obtained in the first case of a compound of formula II, a compound of formula III and a compound of formula IV or of the mixture obtained in the last case of a compound of formula II and a compound of formula VI into its components.

In the compounds of the general formulae I, II, III, IV, V and VI, $R_1$ and $R_2$ as lower alkyl groups are, e.g., the methyl, ethyl, propyl or isopropyl group.

The irradiation of the ketones I in the process according to the invention is advantageously performed in organic solvents, e.g. in aliphatic and/or cycloaliphatic hydrocarbons, such as pentane, hexane, cyclohexane or methylcyclohexane, aliphatic or cyclic ethers such as diethyl ether or dioxane, or in alcohols such as methanol, ethanol or tert.butanol.

A suitable light source is artificial light or strong natural light. It is preferable to use ultraviolet light, such as is produced by low-pressure mercury vapour tubes, or particularly that produced by high-pressure mercury vapour tubes, or strong sunlight. The irradiation is carried out preferably at temperatures of between 0° and 80°C. It is advantageously performed in a nitrogen atmosphere in a quartz or Pyrex vessel, in which the light source is arranged centrally and cooled with water.

The starting materials having hydrogen atoms $Y_2$ and $Y_3$ and those having hydrogen atoms $Y_1$ and $Y_3$, i.e. dihydro-$\beta$-ionone and homologues and dihydro-$\alpha$-ionone and homologues, respectively, are exposed to light preferably until complete, or practically complete, conversion is obtained. The same applies in the case of starting materials having hydrogen atoms $Y_1$ and $Y_2$, i.e., dihydro-$\gamma$-ionone and homologues, in so far as it is desired to obtain as sole product or as main product a compound of the general formula II. On the other hand, compounds of the general formula VI are obtained in better yield and are easily separated if the irradiation of the starting materials of the dihydro-$\gamma$-ionone type is carried out only to the extent of a partial conversion, e.g., 40–50 percent, because, in this case, the proportion of the compound of the general formula II obtained from the intermediately formed rearrangement product of the dihydro-$\alpha$-ionone type is only small.

The reaction mixture obtained on irradiation is processed in the usual manner, e.g., by chromatography on silica gel, and/or fractional distillation, molecular distillation and, in particular, by gas-chromatographical separation. The ketones and aldehydes of formula I, used as starting materials for the present process, are known or can be produced by methods known per se. The belong preferably to the series of dihydroionones or dihydroirones, as well as to the aldehydes obtainable from these ketones, i.e., corresponding compounds having a hydrogen atom $R_2$.

The photocyclization products obtained according to the process are new, and they form also a constituent of the present invention. They constitute a new class of valuable odoriferous substances, which are useful as ingredients of perfume compositions, perfumed products and flavouring compositions. Of particular value are compounds of the general formulae II, III, IV, V and VI wherein $R_1$ represents hydrogen or a methyl group, $R_2$ represents hydrogen or a methyl or ethyl group, and $R_3$ represents hydrogen or a methyl group.

The new compounds can be used, in a small but odoriferously effective amount on their own or together with other odoriferous substances as components of perfume compositions, perfumed products and flavouring compositions. In the preparation of such compositions and products, it is possible to use the mixture of the obtained photolysis products of the general formulae II, III and IV, the mixtures of the compounds of the general formulae II and III, or II and VI respectively, or the compounds isolated in the pure form of the general formulae II or III or IV or V or VI.

The compounds of the general formula II produce a typical moss odor; those of the general formula III, however, are distinguished by a perfume nuance of the same type as that of the odoriferous substance Parmon, which can be isolated from Parma violet but which is structurally not clarified. The compounds of the general formulae IV, V and VI likewise constitute valuable odoriferous substances. The compounds of formula V have a surprisingly strong and persistent odor of a new kind of nuance.

The process according to the invention is described in the following examples. The temperatures are given in degrees Centigrade. The employed trivial names correspond to the following denotations of Chemical Abstracts:

| | |
|---|---|
| dihydro-β-ionone: | 4-(2,6,6-trimethyl-1-cyclohexen-1-yl)-2-butanone, |
| dihydro-β-irone: | 4-(2,5,6,6-tetramethyl-1-cyclohexen-1-yl)-2-butanone, |
| dihydro-α-ionone: | 4-(2,6,6-trimethyl-2-cyclohexen-1-yl)-2-butanone, |
| dihydro-α-irone: | 4-(2,5,6,6-tetramethyl-2-cyclohexen-1-yl)-2-butanone, |
| dihydro-γ-ionone: | 4-(2,2-dimethyl-6-methylenecyclohexyl)-2-butanone. |

The process examples as well as the further examples concerning perfume compositions do not in any way limit the scope of the invention.

EXAMPLE 1

A 0.33 molar solution of 1.0 g of dihydro-β-ionone in pentane is irradiated in a quartz vessel. The light-source used is a 125-watt medium-pressure mercury vapour tube. The solution is exposed to the light for five hours to effect the complete conversion of the dihydro-β-ionone. The solvent is separated from the clear colourless reaction solution by means of distillation through a Vigreux column at 45° and under normal pressure, and the residue then gas-chromatographically processed. The apparatus employed is a Varian-Aerograph A-90 P3 apparatus, which operates with helium as the carrier gas. The flow rate of the helium is 100 ml/min. The separation of the product mixture is performed on a preparative QF-1 column at 145° [column size 10 feet × 3/8 inch, column material 10 percent fluoro-silicone FS 1265 on Chromosorb W (80-100)]. The isolation in pure form can thus be obtained of 2,2,6,7-tetramethyl-10-oxatricyclo[5.2.1.0$^{1,6}$]-decane, i.e., the compound of the general formula II with hydrogen as $R_1$ and $R_3$ and the methyl groups as $R_2$, denoted in the following as $II_1$; and of 2,6,6-trimethyl-10-methylene-1-oxaspiro[4,5]decane, i.e., the compound of the general formula III with hydrogen as $R_1$ and $R_3$ and the methyl group as $R_2$, denoted in the following by the symbol $III_1$. The chemical yield in the case of $II_1$ is 32 percent of the theoretical value and 8 percent in the case of $III_1$. The compound $II_1$ has a retention time of 8.6 min., the compound $III_1$ a retention time of 4.4 min.. The compound $III_1$ is isolated as oil; the compound $II_1$, on the other hand, partially crystallises out, and has a M.P. of 102°–103°.

Compound $II_1$ is identified by the following spectroscopic data:

Mass spectrum:
 m/e = 195(1,8); 194(35,M$^+$/C$_{13}$H$_{22}$O); 193(3); 179(23); 176(23); 161(45); 151(11); 137(15);136(44); 135(5); 124(9); 123(50); 122(13); 121(100); 120(8); 119(24); 109(30); 108(6); 107(20); 106(9); 105(18); 96(6); 95(38); 94(10); 93(38); 91(18); 83(6); 82(10); 81(34); 79(24); 77(14); 71(12); 69(23); 67(20); 59(5); 57(10); 55(30); 53(16); 43(100); 41 (48);

Infrared spectrum
 (CCl$_4$) 2960, 2920, 2862, 1460, 1375, 1360, 1285, 1240, 1222, 1155, 1140, 1080, 1010, 975, 912, 880, 858 cm$^{-1}$ Nuclear resonance spectrum:
 (CDCl$_3$, 100 MHz) 0,68/S,CH$_3$; 1,04/s,CH$_3$; 1,4/s,CH$_3$; 1,49/s,CH$_3$; 0,75-1,1 as well as 1,1-1,8 and 1,9-2,6/m (10 H)

Compound $III_1$ gives the following spectroscopic data:

Mass spectrum:
 m/e = 195(9); 194(55,M$^+$/C$_{13}$H$_{22}$O); 175(8); 161(5); 151(8); 139(6); 138(27); 137(7); 136(6); 126(12); 125(100); 123(12); 121(12); 111(16); 109(15); 107(10); 98(18); 96(10); 95(25); 93(10); 91(10); 83(12); 82(10); 81(17); 79(11); 77(10); 70(10); 69(80); 67(16); 56(10); 55(34); 43(39); 41(46);

Infrared spectrum:
 (CCl$_4$) 3085, 2970, 2930, 2865, 1455, 1440, 1380, 1360, 1300, 1152, 1110, 1092, 1065, 1060, 1020, 965, 915, 900, 860 cm$^{-1}$.

Nuclear resonance spectrum:
 (CDCl$_3$,100 MHz) 0.92/s,gem. (CH$_3$)$_2$;1,25/d,J=6 Hz,CH$_3$; 1,1-1,78 and 1,78-2,5/m (11 H); 4,68-4,72/m (1 H); 4,85-4,92/m (1 H).

Example 2

By irradiation of dihydro-β-irone analogously to the procedure described in Example 1, there is obtained a mixture of the compounds $II_2$, 2,2,3,6,7-pentamethyl-10-oxatricyclo [5.2.1.0$^{1,6}$]decane, and $III_2$, 2,6,6,7-tetramethyl-10methylene-1-oxaspiro[4,5]decane, i.e. of the compounds of the general formulae II and III with methyl groups as $R_1$ and $R_2$ and hydrogen as $R_3$. This mixture can be separated into its components in the manner described in Example 1.

Example 3

A 0.033 molar solution of 4 g of dihydro-$\beta$-ionone in pentane is irradiated in a circulation apparatus made of quartz. The source of light is a 250-watt medium-pressure mercury vapour tube. The solution is exposed to light for 16 hours to effect a conversion of 95 percent of dihydro-$\beta$-ionone. The solvent is removed from the clear, yellow-green reaction solution by means of distillation through a Vigreux column at 45° and under normal pressure. The oily, intensely viscous residue is subjected to a molecular distillation treatment at a pressure of $10^{-5}$ Torr, and the readily volatile components (ca. 3 g) distilled over. The colourless, low-viscous distillate is subsequently processed by gas-chromatography. The apparatus employed is a Varian-Aerograph A-90 P3 apparatus, which operates with helium as the carrier gas. The separation of the product mixture is effected on a preparative QF-1 column at 145° [column size 10 feet × 3/8 inch, column material 10 percent fluoro-silicone FS 1265 on Chromosorb W (80-100)]. The isolation in pure form can thus be obtained of 2,2,6,7-tetramethyl-10-oxatricyclo[5.2.1.0$^{1,6}$]decane, i.e., the compound of the general formula II with hydrogen as $R_1$ and $R_3$ and the methyl group as $R_2$ and denoted in the following by the symbol $II_1$; 2,6,6-trimethyl-10-methylene-1oxaspiro[4,5]decane, i.e., the compound of the general formula III with hydrogen as $R_1$ and $R_3$ and the methyl group as $R_2$, and denoted in the following by the symbol $III_1$; as well as 2,2,6,7-tetramethyl-bicyclo[4.3.0]non-9-en-7-ol, i.e., the compound of the general formula IV with hydrogen as $R_1$ and $R_3$ and the methyl group as $R_2$, and denoted in the following by the symbol $IV_1$. The chemical yield is 35 percent in the case of $II_1$, 18 percent in the case of $III_2$, and 8 percent in the case of IV of the theoretical value. The compound $II_1$ has a retention time of 8.6 min., the compound $III_1$ a retention time of 4.4 min., and the compound $IV_1$ a retention time of 9.8 min.. The products $III_1$ and $IV_1$ are isolated as oil; the compound $II_1$, however, partially crystallises out, and has a M.P. of 102°–103°.

Compound $II_1$ is identified by the following spectroscopic data:
Mass spectrum:
m/e = 195(1,8); 194(35,M$^+$/C$_{13}$H$_{22}$O); 179(23); 176(23); 161(45); 151(11); 137(15); 136(44); 123(50); 122(13); 121(100); 119(24); 109(30); 107(20); 105(18); 95(38); 94(10); 93(38); 91(18); 82(10); 81(34); 79(24); 77(14); 71(12); 69(23); 67(20); 57(10); 55(30); 53(16); 43(100); 41(48);
Infrared spectrum:
(CCl$_4$) 2960, 2920, 2862, 1460, 1375, 1360, 1285, 1240, 1222, 1155, 1140, 1080, 1010, 975, 912, 880, 858 cm$^{-1}$.
Nuclear resonance spectrum:
(CDCl$_3$,100 MHz) 0,68/s,CH$_3$; 1,04/s,CH$_3$; 1,4/s,CH$_3$; 1,49/s,CH$_3$; 0,75-1,1 as well as 1,1-1,8 and 1,9-2,6/m (10 H).

Compound $III_1$ is identified by the following analytical data:

Combustion analysis:
C$_{13}$H$_{22}$O Calculated: C 80,35% H 11,41%
Found: C 80,47% H 11,33%

Mass spectrum:
m/e = 195(9); 194(55,M$^+$/C$_{13}$H$_{22}$O); 175(8); 161(5); 151(8); 139(6); 138(27); 137(7); 136(6); 126(12); 125(100); 123(12); 121(12); 111(16); 109(15); 107(10); 98(18); 96(10); 95(25); 93(10); 91(10); 83(12); 82(10); 81(17); 79(11); 77(10); 70(10); 69(80); 67(16); 56(10); 55(34); 43(39); 41(46);
Infrared spectrum:
(CCl$_4$) 3085, 2970, 2930, 2865, 1455, 1440, 1380, 1360, 1300, 1152, 1110, 1092, 1065, 1060, 1020, 965, 915, 900, 860 cm$^{-1}$.
Nuclear resonance spectrum:
(CDCl$_3$, 100 MHz) 0,92/s,gem. (CH$_3$)$_2$; 1,25/d,J=6 Hz, CH$_3$; 1,1-1,78 and 1,78-2,5/m (11 H); 4,68-4,72/m (1 H): 4,85-4,92/m (1 H).

Compound $IV_1$ is identified by the following analytical data:

Combustion analysis:
C$_{13}$H$_{22}$O Calculated: C 80,35% H 11,41%
Found: C 80,25% H 11,47%

Mass spectrum:
m/e = 195(3); 194(15,M$^+$/C$_{13}$H$_{22}$O); 179(33); 176(38); 161(69); 137(13); 136(70); 123(53); 121(100); 119(30); 109(28); 107(22); 105(22); 95(39); 93(31); 91(19); 81(27); 79(19); 77(14); 69(28); 55(25); 43(41);
Infrared spectrum:
(CCl$_4$) 3580, 3050, 2960, 2920, 2865, 2841, 1630, 1462, 1382, 1371, 1345, 1210, 1165, 1155, 1120, 1091, 1040, 981, 921, 914, 861, 850, 682 cm$^{-1}$.
(CHCl$_3$) 3570 (sharp) 3440 (broad, weak).
Nuclear resonance spectrum:
(CDCl$_3$, 100 MHz) 1,05/s,CH$_3$; 1,16/s,gem.(CH$_3$)$_2$; 1,22/s,CH$_3$; 1,8/s,OH (is extinguished by addition of D$_2$O); 1,23–1,95/m (6 H); 2,18–2,61/q, each of the signals is split up to give d (2 H); 5,38–5,48/m (1 H);
Decoupling test:
with irradiation between 5.41–5.42 there occurs a simplification of the signal at 2.18–2.16 to give pure q with J = 8 c.p.s.

Example 4

A 0.05 molar solution of 4.25 g of 3-[2,6,6-trimethyl-1-cyclohexen-1yl]-propionaldehyde in pentane is irradiated in a circulation apparatus made from quartz. The light-source employed is a 250-watt medium-pressure mercury vapour tube. The solution is exposed to light for 20 hours to obtain a conversion of the 3-[2,6,6-trimethyl-1-cyclohexen-1-yl]-propionaldehyde of 90 percent. The solvent is removed from the clear reaction solution by means of distillation through a Vigreux column at 45° under normal pressure. The oily, intensely viscous residue is subjected to a molecular distillation process with a pressure of $10^{-5}$, and the readily volatile components (ca. 3–3.5 g) separated as distillate. The colourless, low-viscous distillate is subsequently processed by gas chromatography. The apparatus used is a Varian-Aerograph A-90 P3 apparatus, which operates with helium as the carrier gas. The separation of the product mixture is effected on a preparative QF-1 column at 138° [column size 10 feet × 3/8 inch, column material 11 percent fluoro-silicone FS 1265 on Chromosorb W (60-80/AW-DMCS]. The isolation in pure form can thus be obtained of 2,2,6-trimethyl-10-oxatricyclo[5.2.1.0$^{1,6}$]decane, i.e., the compound of the general formula II with hydrogen as $R_1$, $R_2$ and $R_3$ and denoted in the following by $II_3$; 6,6-dimethyl-10-methylene-1oxaspiro[4,5]decane, i.e., the compound of the general formula III with hydrogen as $R_1$, $R_2$ and $R_3$ and denoted in the following by $III_3$; as well as 2,2,6-trimethyl-bicyclo[4.3.0]non-9-en-7-ol, i.e., the compound of the general formula IV with hydrogen as $R_1$ and $R_2$ and denoted in the following by $IV_3$. The chemical yield in the case of $II_3$ is 14 percent of the theoretical value, in the case of $III_3$ 6.5 percent, and in the case of $IV_3$ 20 percent. A retention time of 11.5 min. is obtained for compound $II_3$, a rentention time of 7 min. for compound $III_3$, and a retention time of 13 min. for compound $IV_3$. The compounds $II_3$ and $III_3$ are isolated as colourless oils. The compound $II_3$ has a B.P. of 80°–82°/11 Torr. The compound $IV_3$ is solid; the colourless crystals melt at 63°–65°.

Compound $II_3$ is identified by the following analytical data:

Combustion analysis:
  $C_{12}H_{20}O$ Calculated: C 79,94% H 11,18%
               Found: C 79,87% H 11,27%

Mass spectrum:
  m/e = 181(6); 180(43,M$^+$/C$_{12}$H$_{20}$O); 165(53); 147(80); 137(23); 136(40); 124(20); 123(92); 121(67); 109(60); 107(40); 105(47); 95(60); 93(58); 91(41); 81(78); 79(41); 69(42); 67(54); 55(54); 43(68); 41(100);
Infrared spectrum:
  (CCl$_4$) 2950, 2920, 2860, 1625 (weak), 1461, 1438, 1381, 1375, 1360, 1290, 1165, 1135, 1115, 1100, 1073, 1050, 1010, 991, 955, 939, 896, 848 cm$^{-1}$.
Nuclear resonance spectrum:
  (CCl$_4$,100 MHz) 0,77/s,CH$_3$; 0,90/s,CH$_3$; 1,10/s,CH$_3$; 3,74/broad s (1 H); 0,8-2,1/m (10 H);

Compound $III_3$ is identified by the following analysis data:

Combustion analysis:
  $C_{12}H_{20}O$ Calculated: C 79,94% H 11,18%
               Found: C 79,94% H 11,32%

Mass spectrum:
  m/e = 181(6); 180(33,M$^+$/C$_{12}$H$_{20}$O); 165(7); 137(12,6); 125(10); 124(30); 121(9); 112(10); 111(100); 110(14); 109(10); 97(16); 96(11); 95(14); 81(11); 69(40); 67(10); 55(16); 43(15); 41(26);
Infrared spectrum:
  (CCl$_4$) 3085, 2970, 2925, 2860, 1645, 1452, 1440, 1380, 1360, 1185, 1125, 1085, 1071, 1055, 1042, 995, 975, 965, 930, 900 cm$^{-1}$.
Nuclear resonance spectrum:
  (CCl$_4$,100 MHz) 0,88/s,CH$_3$; 0,9/s,CH$_3$; 0,93-2,52/m (10 H); 3,6-3,8/m (2 H); 4,62-4,72/m (1 H); 4,78-5,5/m (1 H);

Compound $IV_3$ is identified by the following analysis data:

Combustion analysis:
  $C_{12}H_2O$ Calculated: C 79,94% H 11,18%
              Found: C 79,94% H 11,17%

Mass spectrum:
  m/e = 181(10); 180(60,M$^+$/C$_{12}$H$_{20}$O); 165(77); 162(21); 147(100); 137(31); 136(53); 123(55); 122(20); 121(46); 119(21); 110(19); 109(89); 107(40); 105(39); 95(48); 93(39); 91(30); 81(44); 79(27); 77(21); 69(29); 67(24); 55(39); 53(15); 43(60); 41(48);
Infrared spectrum:
  (CCl$_4$) 3630, 3595, 3470, 3060, 2960, 2930, 2870, 2845, 1645(weak), 1462, 1442, 1395, 1385, 1372, 1362, 1285, 12,68, 1215, 1190, 1175, 1152, 1135, 1068, 1060, 1048, 1010, 985, 970, 960, 920, 880, 860, 850, 680 cm$^{+1}$.
Nuclear resonance spectrum:
  (CDCl$_3$,100 MHz) 1,12/s,gem. (CH$_3$)$_2$; 1,16/s,CH$_3$; 0,9-1,9/m (7 H); 2,1/d (split up, J$_{long-range}$ = 2 Hz),J$_{gem}$ = 18 Hz (1 H); 3,8/d,J$_{gem}$ = 7 Hz (1 H); 5,32/singloides m (1 H) the addition of D$_2$O produces at 1,56 the extinction of a proton signal (OH)
Decoupling test:
  Irradiation at 5,32 extinguishes the long-range coupling of d at 2,1 and of q at 2,72.

Example 5

A 0.29 molar solution of 1 g of dihydro-α-ionone in pentane is irradiated in a quartz vessel. The lightsource employed is a 125-watt medium-pressure mercury vapour tube. The solution is exposed to light for five hours to obtain complete conversion of the dihydro-α-ionone. The solvent and low-molecular photolysis products are separated from the clear, colourless reaction solution by distillation through a Vigreux-column at 45° and under reduced pressure (20 mm/Hg); the residue is subsequently processed by gas chromatography. The apparatus used is a Varian-Aerograph A-90 P3 apparatus, which operates with helium as the carrier gas. The rate of flow of the helium is 100 ml/min.. The separation of the product mixture is effected on a preparative QF-1 column at 160° [column size 10 feet × 3/8 inch, column material 10 percent fluoro-silicone FS 1265 on Chromosorb W (80-100)]. The isolation in pure form can thus be obtained of 3,7,7,10-tetramethyl-2-oxatricyclo[4.3.1.0$^{3,10}$]decane, i.e., the compound of formula V with hydrogen as $R_1$ and the methyl group as $R_2$, and denoted in the following by $V_1$. Yield 10 percent of theory). (retention time of the compound $V_1$ : 9.6 minutes).

Spectroscopic data of the obtained Compound $V_1$:
Mass spectrum:
  m/e = 194(3,M$^+$/C$_{13}$H$_{22}$O); 193(2); 176(11), 138(9); 137(15); 136(51); 124(7); 123(33); 122(6); 121(32); 109(8); 107(12); 96(13); 95(100); 94(14); 93(15); 91(8); 81(18); 79(12); 77(8); 69(8); 67(12); 59(16); 55(16); 43(35); 41(23);
Infrared spectrum:

(CHCl$_3$) 2960, 2930, 2870, 1461, 1445, 1385, 1380, 1375, 1365, 1350, 1330, 1160, 1125, 1095, 1085, 1065, 1045, 1033, 1020, 1000, 980, 970, 940, 920, 895, 880, 870 cm$^{-1}$.

Nuclear resonance spectrum:

(CDCl$_3$,100 MHz) 0,94/s,gem.(CH$_3$)$_2$; 1,06/s,CH$_3$; 1,38/s,CH$_3$; 1,16-1,5 and 1,5-2,2/m (9 H); 4,5/t (1 H), J = 2Hz.

Example 6

By irradiation of dihydro-α-irone in an analogous manner to that described in Example 5, there is obtained 3,7,7,8,10-pentamethyl-2-oxatricyclo[4.3.1.0$^{3,10}$]decane V$_2$, i.e., the compound of the general formula V with methyl groups as R$_1$ and R$_2$, and hydrogen as R$_3$, which can be isolated as described in Example 5.

Example 7

A 0.029 molar solution of 1 g of dihydro-γ-ionone in pentane is irradiated in a quartz vessel. The light-source employed is a 125-watt medium-pressure mercury vapour lamp. The solution is exposed to light until complete conversion of the dihydro-γ-ionone has occurred. The solvent is separated from the reaction solution by means of distillation through a Vigreux column at 45° under normal pressure, and the residue subsequently processed by gas chromatography. The apparatus employed is a Varian-Aerograph A-90 P3 apparatus, which operates with helium as the carrier gas. The flow rate of the helium is 100 ml/min.. The separation of the product mixture is effected on a preparative QF-1 column at 145° [column size 10 feet × 3/8 inch, column material 10 percent fluoro-silicone FS 1265 on Chromosorb W (80-100)]. The isolation in pure form can thus be obtained of 2,2,6,7-tetramethyl-10-oxa-tricyclo[5.2.1.0$^{1,6}$]decane, i.e., the compound denoted in the following by the symbol II$_1$, with hydrogen as R$_1$ and R$_3$ and the methyl group as R$_2$. The compound has a retention time of 4.4 minutes. On isolation, the compound partially crystallises out, and has a M.P. of 102°–103°. Spectroscopic data are given in Example 1.

Example 8

A 0.064 molar solution of 6 g of dihydro-γ-ionone in pentane is irradiated in a circulation apparatus made of quartz. The light-source employed is a 250-watt medium-pressure mercury vapour lamp. The solution is exposed to light until a conversion of the dihydro-γ-ionone of 40 percent is obtained. The solvent is removed from the clear reaction solution by means of distillation through a Vigreux column at 60° under normal pressure. The oily residue is separated by column chromatography (stepped column, carrier material: silica gel; solvent: mixture of ether and pentane in a 1:1 ratio), and the obtained fractions are then processed by gas chromatography. The apparatus employed is a Varian-Aerograph A-90 P3 apparatus, which operates with helium as the carrier gas. The flow rate of the helium is 100 ml/min.. The separation of the product mixtures is effected on a preparative SE-52 column at 208° [column size 10 feet × 3/8 inch, column material 15 percent Silicon Gum Rubber SE-52 on Chromosorb W ( 80-100)]. The isolation in pure form, as colourless oil, can thus be obtained of 4,8,8-trimethyl-3-oxatricyclo[5.4.0.0$^{1,4}$]undecane, the compound denoted in the following by the symbol VI$_1$, with hydrogen as R$_1$ and R$_3$ and the methyl group as R$_2$. The compound has a retention time of 10.6 minutes.

Compound VI$_1$ is identified by the following spectroscopic data:

Mass spectrum:

m/e = 194(2,M$^+$/C$_{13}$H$_{22}$O); 179(4); 176(5); 164(34); 163(18); 149(55); 136(15); 121(18); 108(48); 107(19); 96(100); 95(34); 94(33); 91(17); 81(16); 79(26); 77(15); 69(35); 67(14); 65(4); 55(12); 53(7); 42(16); 41(24);

Infrared spectrum:

(CCl$_4$): 2940 (shoulder), 2915, 2850, 1452, 1440, 1385, 1371, 1362, 1332, 1185, 1170, 1085, 985, 880 cm$^{-1}$ Nuclear resonance spectrum:

(100 MHz,CCl$_4$): 0,74/s,CH$_3$; 0,93/s,CH$_3$; 1,32/s,CH$_3$; 0,96-2,44/m (10 H); 3,79/d,J = 6Hz, and 3,95/d,J = 6Hz,AB-system (2H);

The following examples show compositions of odoriferous substances, the said compositions containing new photocyclisation products according to the present invention.

Example 9

| | Parts |
|---|---|
| Compound II$_1$ = compound of the general formula II wherein R$_1$ and R$_3$ = H, R$_2$ = CH$_3$ (C$_{13}$H$_{22}$O) | 6 |
| dimethyl-benzyl-carbinol acetate | 30 |
| hydroxycitronellal | 35 |
| synthetic geranium oil | 50 |
| isomethyl-α-ionone | 85 |
| linalol | 20 |
| santalol | 50 |
| synthetic strawberry aroma | 60 |
| patchouli | 30 |
| styrax essence | 20 |

The fruity, woody note of the above composition assumes a warmer and more intense perfume nuance by virtue of the presence of Compound II$_1$.

Example 10

| | Parts |
|---|---|
| Compound III$_1$ = compound of the general formula III wherein R$_1$ = and R$_3$ = H, R$_2$ = CH$_3$ (C$_{13}$H$_{20}$O) | 4 |
| pentadecanolide-1,15 | 2 |
| musk ketone | 6 |
| vanillin | 1 |
| linalyl acetate | 8 |
| α-amyl-cinnamaldehyde | 7 |
| C$_{10}$-aldehyde(n-decanol), 10% in diethylphthalate | 3 |
| C$_{11}$-aldehyde (n-undecanol), 10% in diethylphthalate | 4 |
| hydroxycitronellal | 14 |
| isomethyl-α-ionone | 9 |
| isoeugonol extra | 8 |
| balsamol | 40 |
| 2-methyl-5-ethyl-octanol-1 | 10 |
| synthetic violet oil | 2 |
| synthetic rose oil | 8 |
| patchouli | 9 |
| Java vetiver | 5 |

It can be of advantage to use the mixture of the compounds of the general formulae II and III, e.g., the mixture of the compounds II$_1$ and III$_1$, instead of the individual compounds, for compositions of odoriferous substances.

Example 11

| | Parts |
|---|---|
| Compound of the general formula V, wherein R$_1$ and R$_3$ = H, R$_2$ = CH$_3$ (C$_{13}$H$_{22}$O) (Compound V$_1$) | 6 |

Example 11-Continued

|  | Parts |
|---|---|
| dimethyl-benzylcarbinol acetate | 30 |
| hydroxycitronellal | 35 |
| synthetic geranium oil | 50 |
| isomethyl-α-ionone | 85 |
| linalol | 20 |
| santalol | 50 |
| synthetic strawberry aroma | 60 |
| patchouli | 30 |
| styrax essence | 20 |

The wood-fruit-like tone of the above composition assumes a warmer and more intense perfume nuance by virtue of the presence of Compound $V_1$.

Example 12

|  | Parts |
|---|---|
| Compound of the general formula V, wherein $R_1 = CH_3$, $R_2 = CH_3$, $R_3 = H$ ($C_{14}H_{24}O$), (Compound $V_2$) | 4 |
| pentadecanolide-1,15 | 2 |
| musk ketone | 6 |
| vanillin | 1 |
| linalyl acetate | 8 |
| α-amyl-cinnamaldehyde | 7 |
| $C_{10}$-aldehyde (n-decanol), 10% in diethylphthalate | 3 |
| $C_{11}$-aldehyde(n-undecanol),10% in diethylphthalate | 4 |
| hydroxycitronellal | 14 |
| isomethyl-α-ionone | 9 |
| isoeugenol extra | 8 |
| balsamol | 40 |
| 2-methyl-5-ethyl-octanol-1 | 10 |
| synthetic violet oil | 2 |
| synthetic rose oil | 8 |
| patchouli | 9 |
| Java vetiver | 5 |

What we claim is:

1. A compound having the formula

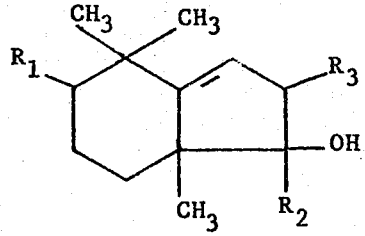

wherein $R_1$, $R_2$ and $R_3$ each independently represent hydrogen or lower alkyl groups.

2. A compound according to claim 1, wherein $R_1$ represents hydrogen or a methyl group, $R_2$ represents hydrogen, methyl or ethyl group, and $R_3$ represents hydrogen or a methyl group.

3. A compound according to claim 1, wherein $R_1$ and $R_3$ represent hydrogen and $R_2$ represents a methyl group.

4. A compound according to claim 1 wherein $R_1$, $R_2$ and $R_3$ represent hydrogen.

* * * * *